United States Patent
Knych (10) Patent No.: US 8,746,645 B2
(45) Date of Patent: Jun. 10, 2014

(54) LAPTOP RISER

(75) Inventor: Bernard L. Knych, Mount Prospect, IL (US)

(73) Assignee: Fellowes, Inc., Itasca, IL (US)

( * ) Notice: Subject to any disclaimer, the term of this patent is extended or adjusted under 35 U.S.C. 154(b) by 432 days.

(21) Appl. No.: 12/716,003

(22) Filed: Mar. 2, 2010

(65) Prior Publication Data

US 2010/0219320 A1 Sep. 2, 2010

Related U.S. Application Data

(60) Provisional application No. 61/156,784, filed on Mar. 2, 2009.

(51) Int. Cl.
*A47B 91/00* (2006.01)
*A47G 29/00* (2006.01)
*B65D 19/00* (2006.01)

(52) U.S. Cl.
USPC ............ 248/346.01; 248/346.03; 248/346.09; 248/615; 248/918

(58) Field of Classification Search
USPC .......... 248/917–923, 346.01, 346.03, 346.09, 248/346.3, 346.5, 615, 618, 634, 460; 361/683, 695; 190/11, 1; 402/8, 19
See application file for complete search history.

(56) References Cited

U.S. PATENT DOCUMENTS

| | | | | |
|---|---|---|---|---|
| 3,833,098 A | * | 9/1974 | Alderman | 190/11 |
| RE30,861 E | * | 2/1982 | Krawagna | 16/293 |
| 5,503,361 A | * | 4/1996 | Kan-O et al. | 248/688 |
| 5,871,094 A | * | 2/1999 | Leibowitz | 206/320 |
| 6,411,288 B1 | * | 6/2002 | Min | 345/204 |
| 6,460,221 B1 | * | 10/2002 | Eromaki | 16/286 |
| 6,527,241 B1 | | 3/2003 | Lord | |
| 6,930,881 B2 | * | 8/2005 | Karidis et al. | 361/679.55 |
| 6,968,056 B2 | * | 11/2005 | Barnett et al. | 379/433.13 |
| 7,467,433 B2 | * | 12/2008 | Wong | 5/655 |
| 7,972,076 B2 | * | 7/2011 | Harris et al. | 402/8 |
| 8,277,140 B2 | * | 10/2012 | Chizmar | 402/20 |
| 2008/0084661 A1 | * | 4/2008 | Lee | 361/687 |
| 2009/0002932 A1 | * | 1/2009 | Lord et al. | 361/683 |

OTHER PUBLICATIONS

Photographs of Xbrand Model XB-1010-US "Laptop Lounge", purchased Nov. 2008.

* cited by examiner

*Primary Examiner* — Amy J. Sterling
(74) *Attorney, Agent, or Firm* — Wood, Phillips, Katz, Clark & Mortimer

(57) ABSTRACT

A portable riser for supporting a laptop computer or other article at an angle to a supporting surface. The riser includes a base and lid attached to each other by a double hinge. Arc shaped legs deploy form the riser when the lid is moved from a closed position to an deployed position a position where the lid rests against the opposite side of the base. The legs are formed by deforming a sheet of flexible material that lies between the base and a cover plate. The lid and the sheet of flexible material are coupled to each other so that when the lid is moved from the closed to the deployed position, the sheet of material is deployed.

12 Claims, 6 Drawing Sheets

LAPTOP RISER

CROSS-REFERENCE TO RELATED APPLICATION

This application claims the benefit of the filing date of U.S. Provisional Application No. 61/156,784, filed Mar. 2, 2009, which is hereby incorporated by reference.

BACKGROUND OF THE INVENTION

1. Field of the Invention

The field of the invention is computer accessories, more particularly, laptop accessories.

2. Background Art

This invention relates to laptop risers, devices that allow a laptop computer to be raised above or positioned at an angle to a surface such as a desk or lap. Users of laptop and other portable electronic devices have found that it is desirable to position the device at an angle with respect to the horizontal. For instance, such angle may provide more comfort when typing on a laptop keyboard, or better viewing of a display screen on the device. In the case of a tablet computer or other touch screen device, the laptop riser can provide an improved angle for writing on the touch screen. The laptop riser of the invention may also be used as a work surface, or support for other devices and articles. For instance, the laptop riser could be used to support a book at an angle to the users lap or table top, thus placing the book at a convenient angle for reading.

As laptop computers and other portable electronic devices have become more powerful, they tend to generate more heat. The heat generated can result in discomfort for the user if the device is resting on the users lap. Additionally, the heat is can be detrimental to the device. Hence, it is beneficial to separate the device from the users lap for benefit of the user and the device.

To aid in dissipating the heat from the device, it is preferred that the structure elevating the laptop have vents or other structures to permit heat to flow from the laptop, particularly if the laptop has an internal fan venting to the bottom of the laptop. To improve comfort of the user, it is also preferable that the users lap is shielded from the vented heat of the laptop. In the configuration described herein, the deployable legs are positioned between the user's lap and the vents provided in the laptop supporting structure or base of the laptop riser.

Since laptop computers are portable, it is also desirable that the laptop riser be portable and of compact size to be easily transportable. Thus, the laptop riser described herein has a first configuration to be compact for transport, and a second configuration wherein the legs, risers, or supports are deployed to allow support of the laptop computer at an angle to the users lap, or other working surface, such as a desktop.

SUMMARY OF THE INVENTION

The device described herein is a laptop riser or support, capable of supporting a laptop computer or other device, at an angle to the users lap or other work surface. The laptop riser includes deployable legs that selectively deploy from the riser. When deployed, the legs allow the laptop riser to be positioned at an angle to the users lap.

The laptop riser is generally planar prior to deployment of the legs. The legs are formed by deforming a plastic sheeted material to form arcs. The legs or structure formed by the sheeted material is remarkably strong in the arc shape. When positioned at one end of a platform or other laptop support surface, the arcs form a light-weight wedge shaped structure to elevate a Laptop at an angle for comfortable viewing or typing. The arcs also form air channels which allow air to flow help to keep the laptop cool. The arcs deform slightly with the weight of a laptop to distribute the weight comfortably across a person's lap. The support surface can include vents to allow the laptop to dissipate heat more effectively than if there were no vents.

In the most basic form, the laptop riser includes a surface to support the laptop, and downwardly extending legs to selectively elevate the platform at an angle. In such a configuration, the base includes an upper surface to support the laptop, and a lower surface from which the legs deploy. The legs may be formed by deforming a plastic sheet material into arc shaped legs. The plastic sheet material is slideably sandwiched between a cover plate attached to the lower surface of the base. The plastic sheet material is attached to the base so that when it is displaced toward the attachment to the base, the legs rise up and deploy. In the preferred embodiment, the plastic sheet is attached near or at the perimeter edge of the base. It is preferable that the plastic sheet be securable in position so that the legs may selectively remain deployed. As further described herein, the laptop riser may contain other features.

In the preferred embodiment, the laptop riser includes a lid to cover the deployable legs when the legs are not deployed, such as in a storage configuration. The cover is hingedly attached to a base member that includes the deployable legs. The lid and the base member are generally coextensive. The lid and base member may latch together in the storage configuration and unlatch for deployment.

The deployable legs are formed from a thin plastic sheet that is sandwiched between the base member, and a cover sheet. The cover sheet allows the thin plastic sheet to slide between the cover sheet and the base. The thin plastic sheet is attached to the base or the cover sheet or both, near the hinge connecting the base member and the lid.

A flexible fabric strap, such as nylon webbing, is used to lift the arcs through a pulling process. The strap is attached to the lid, preferably at a point approximately 1 inch above the hinge and to a slot in the deforming sheeted material. The act of opening the lid and rotating it 360-degrees provides the pulling force and travel needed to pull on the plastic sheet material in the direction of its attachment to the base. The tension forces the plastic sheet to lift and "deform" into the arc shaped legs.

The preferred embodiment includes two deployable arc shaped legs. One skilled in the art will readily recognize that the teachings used to deploy two legs can be used to deploy a single leg, or a plurality of legs. For instance, the two arc shaped legs shown in the preferred embodiment are created by deforming a single plastic sheet. By judicious selection of the size and shape of the sheet, as well as the cover plate or other structure to retain the sheet, a single leg could be formed.

DETAILED DESCRIPTION OF THE PREFERRED EMBODIMENT

With respect to the Figures, the laptop riser 10 of the preferred embodiment includes a lid 20 and a base 30 hingedly attached by at least one double hinge. In the preferred embodiment, three double hinges 40a-c are used.

Figure 7:
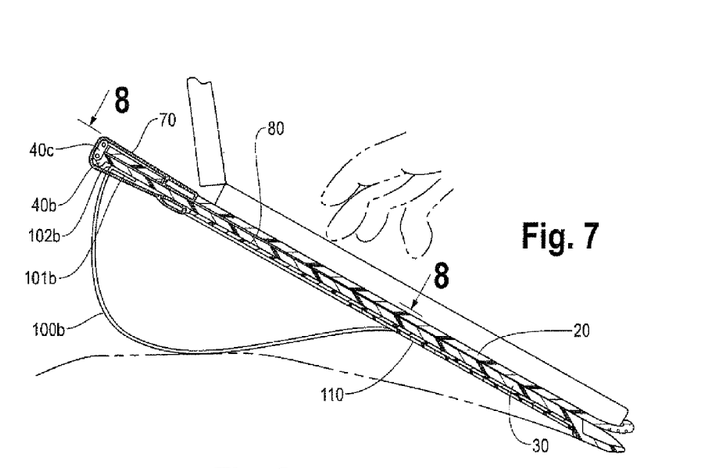
FIG. 7 is a side sectional view of the laptop riser.

The lid 20 and base 30 are generally coextensive and overlay each other. The lid 20 includes a latch 50 that includes tabs 51a and 51b. In the closed or latched position, the tabs 51a and 51b engage the base 30, as shown in FIGS. 1A and 1B. The cross sectional views of 1A and 1D are simplified and do not show all structures. FIG. 7 provides a more comprehensive cross sectional view.

As shown in FIG. 1B, in the closed position, the double hinge 40b forms an angle alpha with respect to the horizontal. In the preferred embodiment, the angle alpha is 45 degrees. Placing the double hinge at an angle allows a slimmer profile than if the double hinge were positioned at 90 degrees to horizontal. The base 20 includes stop 60b in close proximity to the double hinges 40b to prevent over-rotation of the double hinges 40. In the latched configuration, the double hinge 40b is in contact with the stop 60b. Over-rotation of the hinge is undesirable as it would allow easy disengagement of the latch 50.

As shown in FIG. 1B, movement of the hinge 40b and the latch 50 in the direction of the arrows allows the latch 50 to close. Similarly, as shown in FIG. 1D, movement of the hinges 40 and latch 50 in the direction of the arrows in that figure results in the unlatching of the lid 20 from the base 30. As shown in FIG. 1D, the hinge forms angle beta with respect to horizontal, and angle beta is less than angle alpha. Such movement of the hinge 40 allows separation G from the stop 60.

Figure 1:
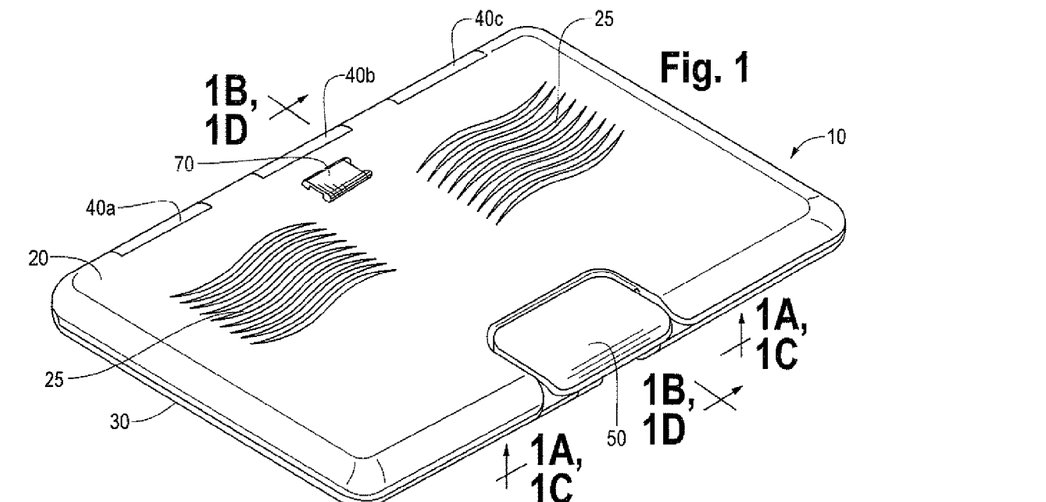
FIG. 1 is a perspective view of the laptop riser in a closed configuration.
Figure 1A:
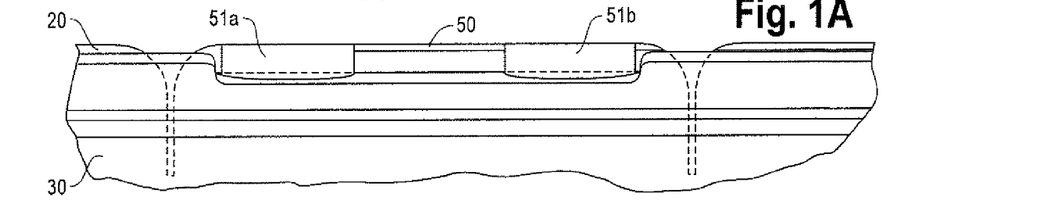
FIG. 1A is a bottom close up view of the latch in a closed configuration.
Figure 1B:
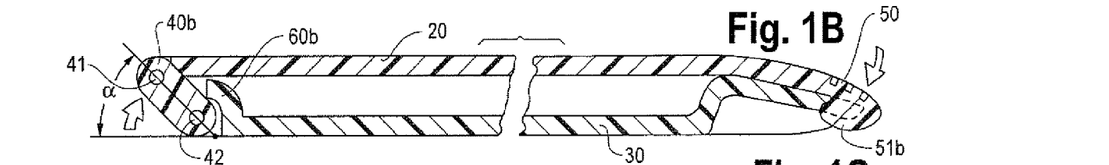
FIG. 1B is a sectional view of the laptop riser in a closed configuration.
Figure 1C:
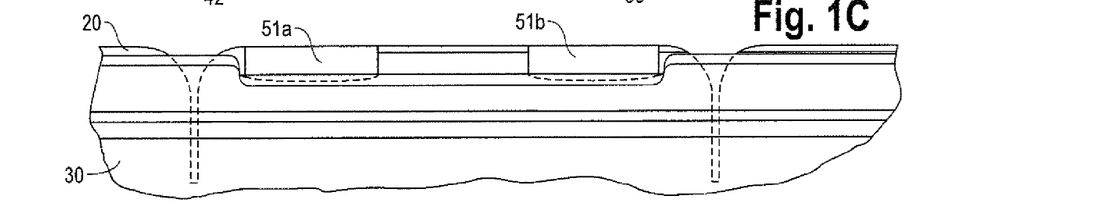
FIG. 1C is a bottom close up view of the larch in an unlatched configuration.
Figure 1D:
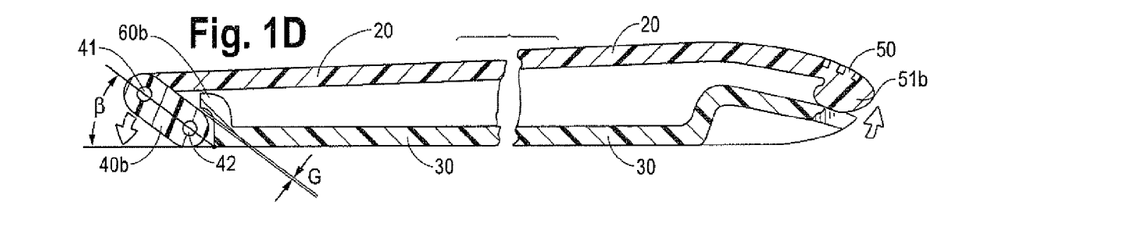
FIG. 1D is a sectional view of the laptop riser in an unlatched configuration.

The lid 20 may be rotated 360 degrees about the hinges to transition from a closed position as shown in FIG. 1 to an open position. The transition is shown in FIGS. 2-6. As the lid 20 and base 30 separate, a strap 70 attached to the lid 20 pulls on a plastic sheet 80 to deploy legs 100a and 100b from a first stowed position to a second deployed position.

When in the open position, the base 20 forms the laptop support surface. The laptop support surface may include non-slip pads 26 to help secure the laptop on the angled surface of the laptop riser 10.

Figures 9, 9A:
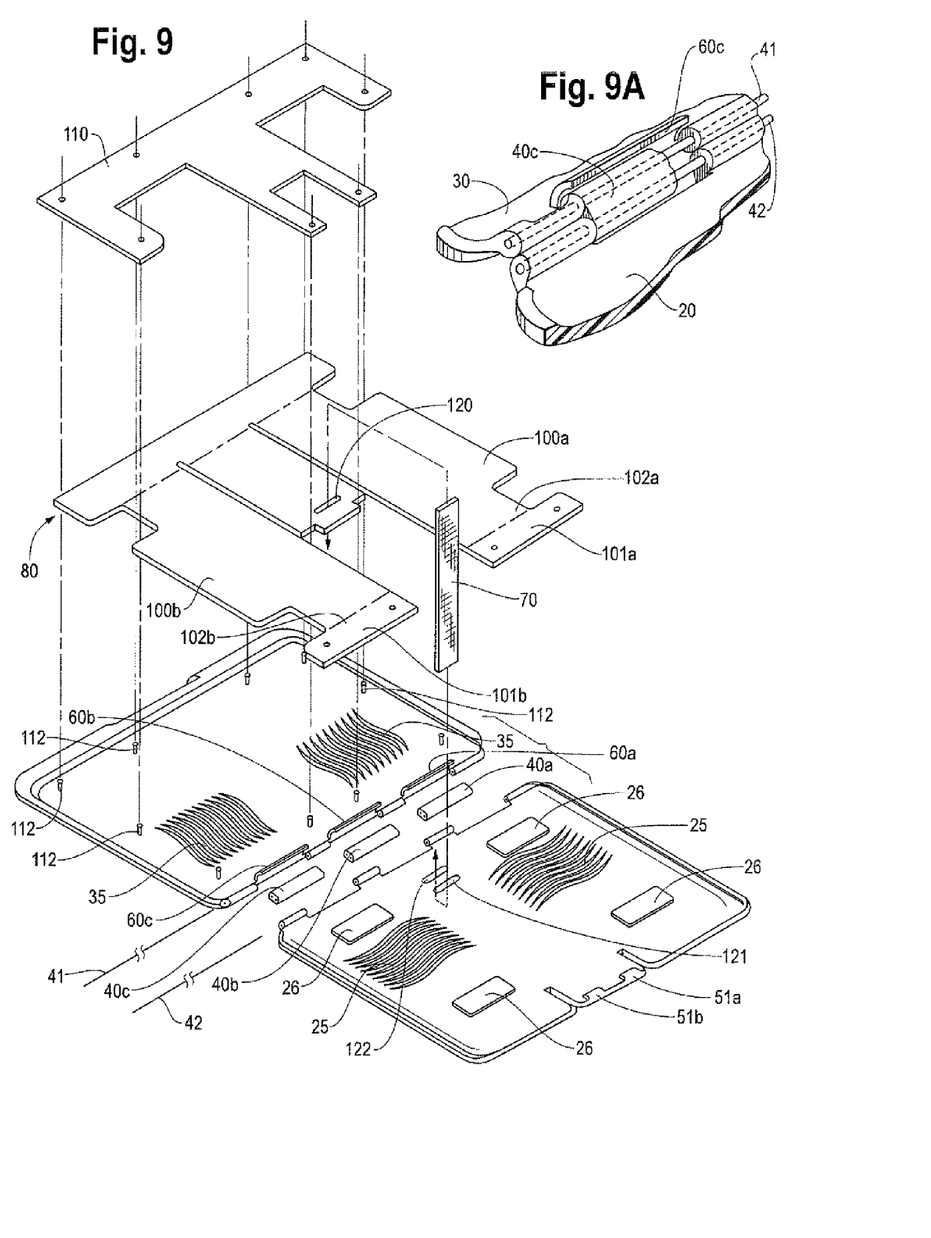
FIG. 9 is an exploded view of the laptop riser.
FIG. 9A is a close up partial cutaway view of the hinge of the laptop riser.

With reference to the exploded view in FIG. 9, the legs 100a and 100b are formed by rising arcs made by deforming the plastic sheet 80. The plastic sheet 80 is preferably made of polypropylene, but may be any deformable material. It is preferred that the plastic sheet 80 is polypropylene and approximately 2.0 mm to 0.8 mm in thickness. It is most preferred that the plastic sheet 80 is 1.0 mm in thickness. The plastic sheet 80 is positioned to slide between the base 30 and a cover plate 110. The cover plate 110 is attached to the base 30, in a parallel plane, but offset or elevated from the base at spacing equal to the thickness of the plastic sheet. Bosses 112 are used to elevate the cover plate 110. This offset space allows the plastic sheet 80 to slide there between so as to allow portions not retained by the cover plate 110 to deform and rise away from the base 30. The legs 100a and 100b of the plastic sheet 80 are attached to the base 30 near the hinges 40a-c. The cover plate 110 is not coextensive with the plastic sheet 80, and does not overlay the legs 100a and 100b, thus allowing the legs to deploy when the plastic sheet 80 is pulled by the strap 70. The cover plate 110 in the preferred embodiment is "T" shaped. One skilled in the art will recognize that other structures could be used in place of the cover plate 110 in order to retain the plastic sheet 80 in a slidable relationship with the base 30. For instance, the lateral edges of the plastic sheet 80 could be retained and slide in channels or slots formed in a raised perimeter of base 30. Further the cover plate 110 could be integrally formed with the base 30.

The lid 20 and base 30 are attached to each other by a plurality of double hinges 40a-40c. The hinges are attached to the base 30 and lid 20 by rods 41 and 42.

The strap 70 is attached to the lid 20 approximately 1 inch from the hinge 40b. As shown in FIG. 9, the strap 70 is inserted into to a slot 120 in the plastic sheet 80 and attached back onto itself by stitching or glue. Similarly, the strap 70 is attached to the lid 20 by inserting the end of the strap 70 through a pair of slots 121 and 122 and attached back onto itself. The strap 70 should be taught when the laptop riser 10 is in the closed position, so as to allow a pulling action on the plastic sheet 80 when the lid 20 is rotated about the hinges 40a-c. In the open position with the legs deployed, the strap 70 also acts to secure the legs 100a and 100b in the deployed position.

Figures 2, 3:
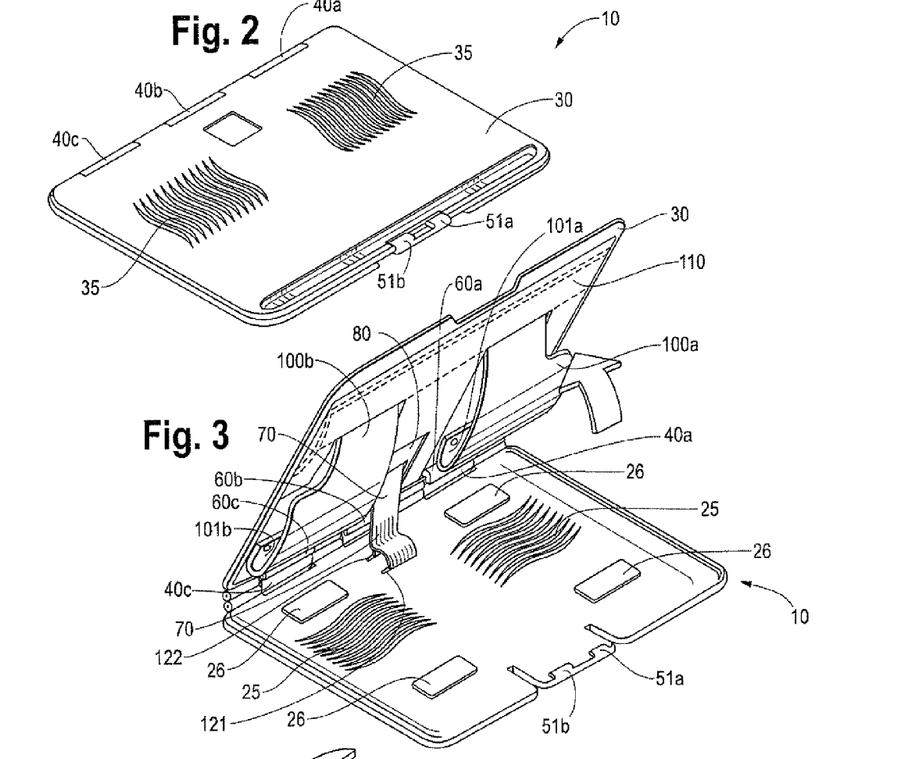
FIG. 2 is a perspective bottom view of the laptop riser in a closed configuration.
FIG. 3 is a perspective view of the laptop riser in a partially open configuration.
Figure 4:
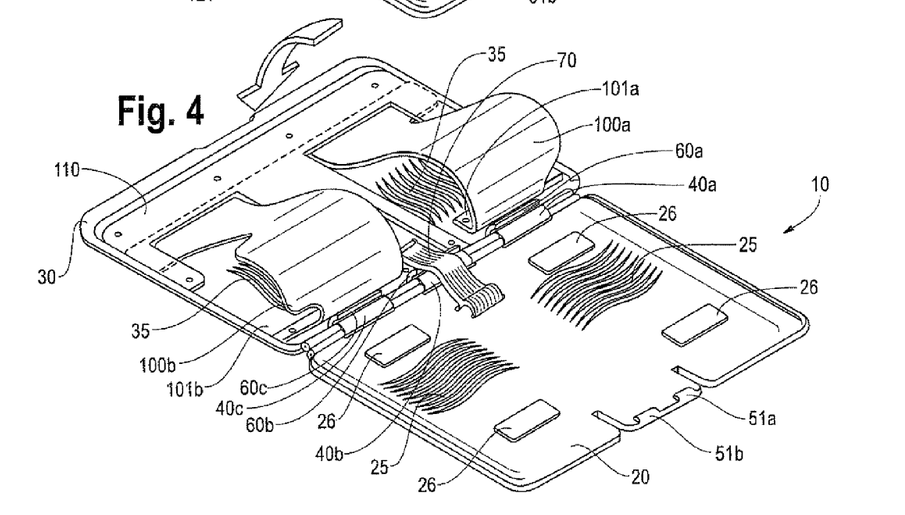
FIG. 4 is a perspective view of the laptop riser in a partially open configuration, with the lid rotated 180 degrees from the closed position.

The legs 100a and 100b include areas of attachment 101a and 101b to the base 30. The areas of attachment 101a and 101b are folded under the legs, so that the leg 100a or 100b overlays the attachment area 101a or 101b. Such positioning is shown in FIGS. 3, 4, and 7. The legs 100a and 100b preferably each include a hinge 102a and 102b linking the areas of attachment 101a and 101b to legs 100a and 100b. The use of the hinges allow for better storage and deployment of the legs 100a and 100b. The hinges 102a and 102b may be living hinges formed of the plastic sheet 80, and need not be separate components attached to the plastic sheet 80.

Figure 6:
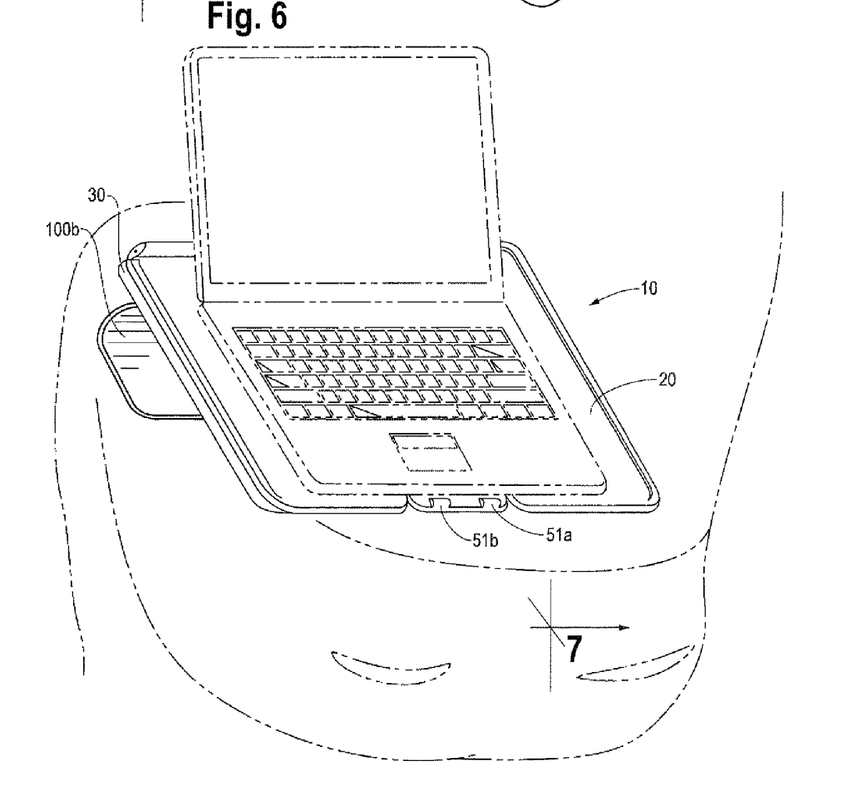
FIG. 6 is a perspective view of the laptop riser in use.

As shown in FIGS. 6 and 7, there is a portion of the legs 100a and 100b that is in contact with the users lap, or other work surface, when the legs are deployed. Those portions of the legs 100a and 100b may include a non-slip coating, insert, attachment, surface treatment, or co-molding, or other substance to aid in secure positioning of the laptop riser, as the polypropylene used for the sheet may be slick.

Figure 5:
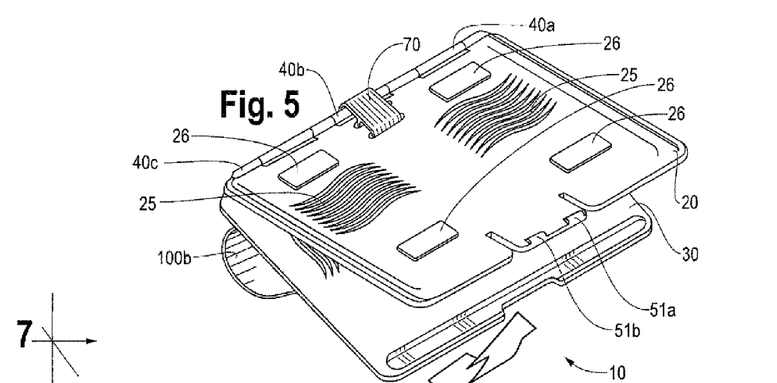
FIG. 5 is a perspective view of the laptop riser in a nearly fully open position, with the legs deployed.
Figure 8:
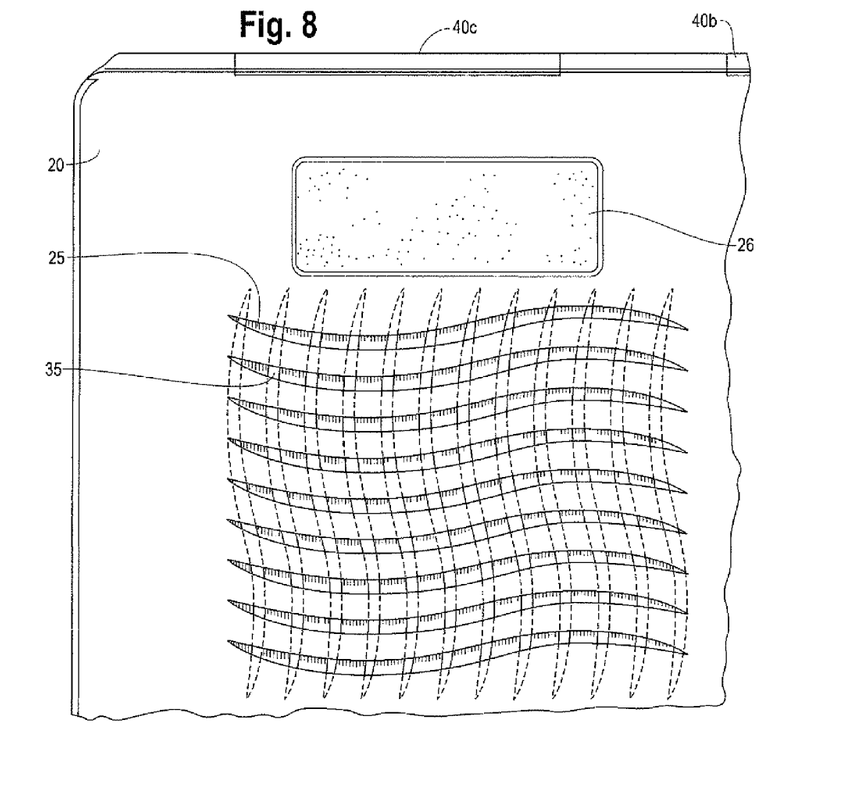
FIG. 8 is a close up view of the vents on the laptop riser in the closed configuration.

As shown in FIGS. 1 and 2, the lid 20 includes vents 25 and the base 30 includes vents 35. When the laptop riser is in the deployed configuration, as shown in FIGS. 5-7, the lid vents 25 overlay the base vents 35. As shown in FIG. 8, the vents may be positioned in orientations that are different from each other. For instance, the lid vents 25 may be oriented 90 degrees from the base vents 35. It is preferable that the lid vents 25 and base vents 35 are positioned over the deployed legs 100a and 100b, to allow the legs to shield the users lap from heat dispersed by the vents. Such placement also allows the air to flow in and out of channels formed by the arc shaped legs.

Figure 10:
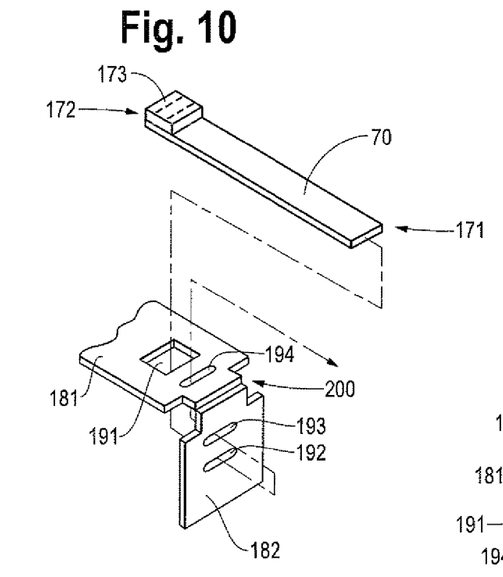
FIG. 10 is a perspective view of an alternate embodiment of the strap attachment to the plastic sheet of the laptop riser.
Figure 10A:
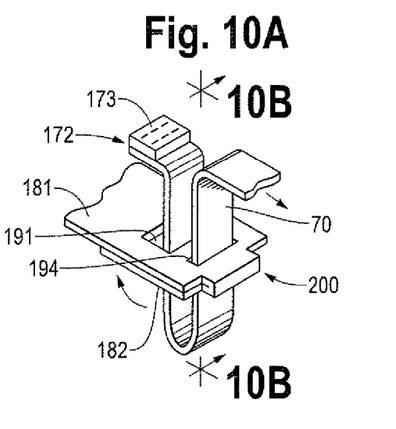
FIG. 10A is a perspective view of an alternate embodiment of the strap attached to the plastic sheet of the laptop riser.
Figure 10B:
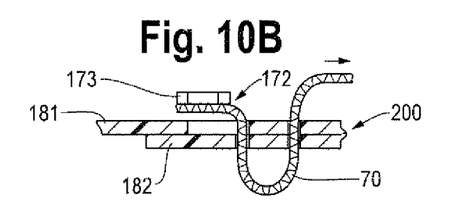
FIG. 10B is a side sectional view of an alternate embodiment of the strap attached to the plastic sheet of the laptop riser.
Figure 10C:
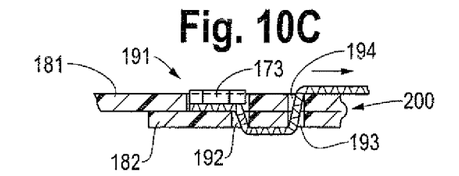
FIG. 10C is a side sectional view of an alternate embodiment of the strap fully attached to the plastic sheet of the laptop riser.
Figure 11:
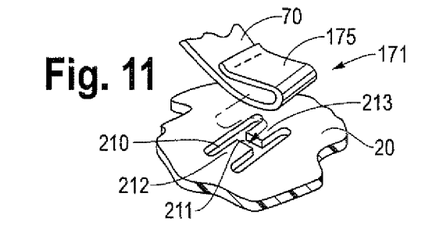
FIG. 11 is a perspective close up view of the strap being attached to the H shaped slot in the lid of the laptop riser.

In an alternate embodiment shown in FIGS. 10A-10C and 11, the strap 70 is constructed so that there is a loop on a first terminal end and a plug on the second terminal end. Such a construction allows the laptop riser to be assembled more easily, without the need to sew or glue loops in the strap 70 after the strap is threaded through slots. The loop on the first terminal end is not shown in FIG. 10, but is shown in FIG. 11. The loop and the plug need not be used together. For instance, the strap 70 may include the plug 173 at the second terminal end 172, but no loop at the first terminal end 171. In such an instance, the strap 70 would attach to the lid by threading the strap 70 through two slots as previously described.

When the plug 173 is used, it is preferable to use a construction that will lock or secure the strap 70 on the plastic sheet 80 so that the strap 70 does not easily detach. As shown in FIGS. 10A-C, the plastic sheet includes an arrangement of slots. A first slot 191 is sized to accept the plug 173. A second slot 192, third slot 193, and forth slot 194, are spaced apart from each other and the first slot 191, and are sized to accept the strap 70, but not the plug 173. The first slot 191 and forth slot 194 are located on a first portion 181 of the plastic sheet, and the second slot 192 and third slot 193 are located on a second portion 182 of the plastic sheet. A fold line or hinge 200 lies between the two portions of the plastic sheet, allowing the second portion 182 to fold about the hinge 200 to underlie the first portion 181. In such a configuration, the first slot 191 and the second slot 192 are aligned, and the forth slot 194 and the third slot 193 are aligned. The alignment allows the first terminal end 171 to be threaded into a first slot 191 and second slot 192, then through the third slot 193 and forth slot 194. The strap 70 is pulled until the plug 173 is in contact with the first portion 181 of the plastic sheet and allowing the plug to reside in the first slot 191, as shown in FIG. 10C.

The first end 171 of the strap 70 having a loop 175 is then worked onto an H-shaped cutout 210 in the lid 20. The horizontal part 211 is offset so that the strap loop 175 can be first sleeved and bunched onto the tabs 212 and 213 then unbunched. It is preferable is one of the tabs 212 or 213 is longer than the other. Such arrangement allows a more secure attachment of the loop 175.

The examples described herein are only examples, and are not meant to limit the scope of the invention.

The invention claimed is:
1. A laptop riser including:
    a base;
    a lid hingedly attached to the base, the lid rotatable about the hinge from a first position to a second position, the movement of the lid acting to deform a flat sheet of plastic attached to the base, the deformed sheet of plastic forming at least one leg to support the base at an angle to a work surface, and a strap connecting the sheet of plastic and the lid.

2. The laptop riser of claim 1, wherein the base and lid are hingedly attached by a double hinge.

3. The laptop riser of claim 2, wherein the base includes a stop to limit the travel of the double hinge.

4. A riser for supporting an object, the riser including
    A base having a first surface for supporting the object, and a second surface,
    A sheet of material having a first end and a second end, the sheet of material attached to the second surface of the base,
    A lid hingedly attached to the base, the lid movable from a first position overlying the second surface of the base to a second position overlying the first surface of the base, the lid coupled to the second end of the sheet of material, a portion of the sheet of material deforming into an arc when the lid is moved from the first position to the second position wherein the lid and second end of the sheet of material are coupled by a strap.

5. The riser of claim 4, wherein the lid a base are hingedly attached by a double hinge.

6. A riser for supporting an object, the riser including
    A base having a first surface for supporting the object, and a second surface,
    A sheet of material having a first end and a second end, the sheet of material attached to the second surface of the base,
    A lid hingedly attached to the base, the lid movable from a first position overlying the second surface of the base to a second position overlying the first surface of the base, the lid coupled to the second end of the sheet of material, a portion of the sheet of material deforming into an arc when the lid is moved from the first position to the second position, the riser, further including a cover plate attached to the second surface of the base, the sheet of material positioned between the base and the cover plate.

7. The riser of claim 6, wherein the cover plate includes an opening through which the arcs deploy.

8. A riser or supporting an object, the riser including
    A base having a first surface for supporting the object, and a second surface,
    A sheet of material having a first end and a second end, the sheet of material attached to the second surface of the base,
    A lid hingedly attached to the base, the lid movable from a first position overlying the second surface of the base to a second position overlying the first surface of the base, the lid coupled to the second end of the sheet of material, a portion of the sheet of material deforming into an arc when the lid is moved from the first position to the second position, wherein the arcs have a nonslip coating.

9. A riser for supporting an object, the riser including
    A base having a first surface for supporting the object, and a second surface,
    A sheet of material having a first end and a second end, the sheet of material attached to the second surface of the base,
    A lid hingedly attached to the base, the lid movable from a first position overlying the second surface of the base to a second position overlying the first surface of the base, the lid coupled to the second end of the sheet of material, a portion of the sheet of material deforming into an arc when the lid is moved from the first position to the second position, wherein the base includes a vent, the vent positioned to overlie the deformed portion of the sheet of material.

10. The riser of claim 9, wherein the lid includes a vent, the vent of the lid and the vent of the base overlying each other when the lid is in the second position.

11. The riser of claim 5, wherein the double hinge is positioned at an angle with respect to the base when the lid is closed.

12. The riser of claim 4, wherein the first surface of the base and the second surface of the base and the second surface of the base are generally parallel to each other.

* * * * *